Jan. 16, 1968 P. J. THUT ET AL 3,363,547
PRESSURE ROLLER CONTROL MEANS IN ITEM ENCODERS
Filed April 16, 1964 10 Sheets-Sheet 1

INVENTOR.
PAUL J. THUT
GEORGE BURKETT JR.
RONALD W. FERGUSON
NORMAN H. PRESTON

Jan. 16, 1968  P. J. THUT ET AL  3,363,547
PRESSURE ROLLER CONTROL MEANS IN ITEM ENCODERS
Filed April 16, 1964  10 Sheets-Sheet 2

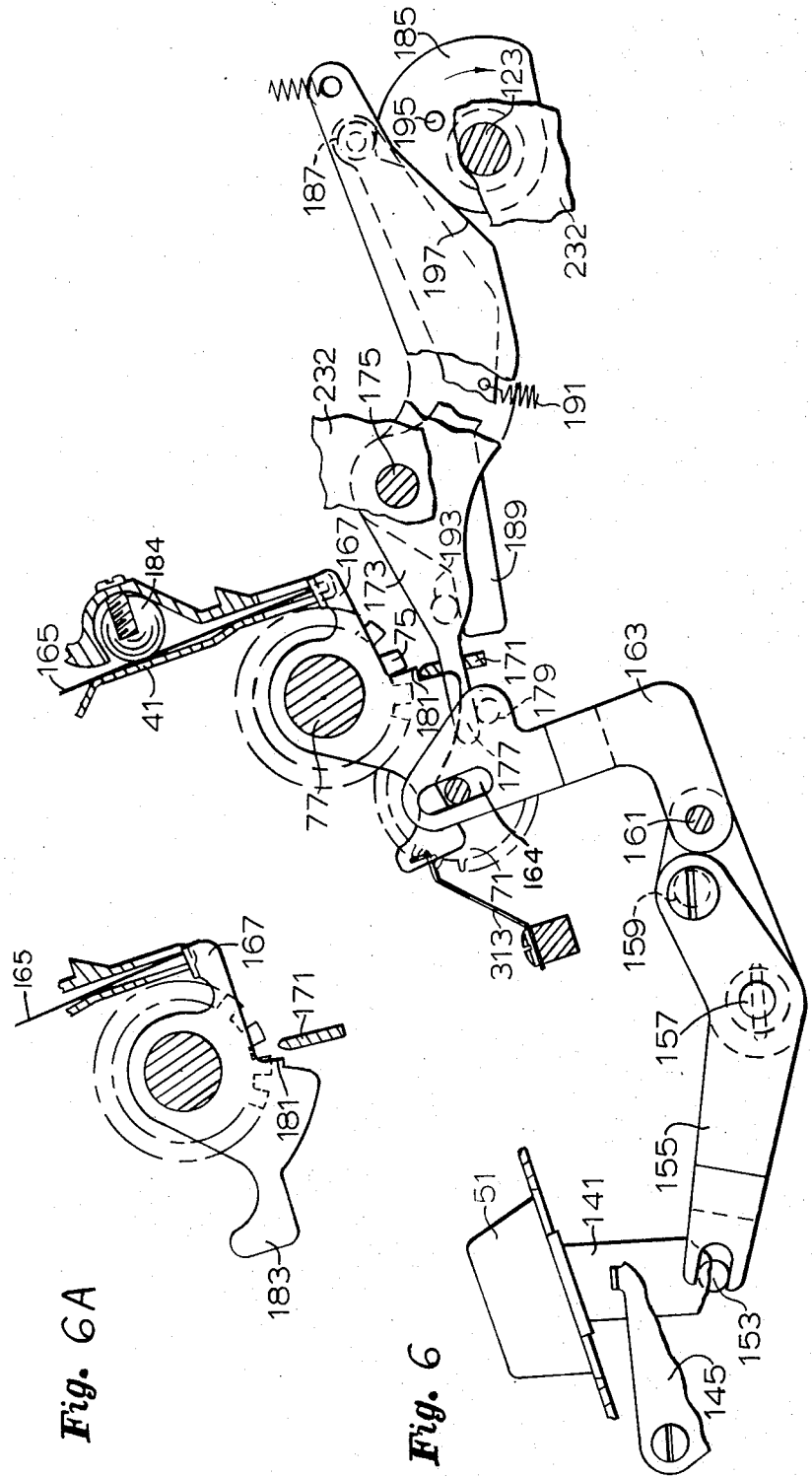

United States Patent Office 3,363,547
Patented Jan. 16, 1968

3,363,547
PRESSURE ROLLER CONTROL MEANS IN
ITEM ENCODERS
Paul J. Thut, Penfield, George Burkett, Jr., Palmyra, and Ronald W. Ferguson and Norman H. Preston, Rochester, N.Y., assignors to Burroughs Corporation, Detroit, Mich., a corporation of Michigan
Filed Apr. 16, 1964, Ser. No. 360,338
17 Claims. (Cl. 101—45)

This invention relates to an apparatus for recording information on a record sheet, and particularly to a machine for recording information, for example amounts, account numbers and bank transit numbers, on a check or other document.

The invention is especially useful for automated information handling systems wherein certain information is printed on the source document itself, such as a check, deposit ticket, charge ticket, or multiple part form, which information is later read to cause the document to be sorted and processed by automatic character recognition equipment. In banking systems which utilize magnetic ink character recognition as a common machine language for mechanized document handling, the information is printed on a check or other document using a type font which is capable of being read by a human being as well as by automatic machinery. Mechanized check handling systems, particularly those utilizing magnetic ink character recognition, require much higher standards of printing with respect to the character shapes and tolerances, the registration and alignment of the characters, the intensity and uniformity of the printing, the absence of voids and extraneous ink, the character spacing and alignment, and the embossment of the document. These requirements are very demanding in order to insure that a document is produced which will be read by automatic machinery without error.

Certain information may be printed on a document by the manufacture of the document, for example by the printer in case of a check, while other information will be applied to the document after it has been completed by the maker. Generally, after a check has been cashed or the deposit presented to a bank, amount information may be added to the encoding. The machine of this invention is adapted to apply any of the information to be encoded on the document at any stage in its handling at which additional coding is desired. Thus, a document which does not have encoded thereon the transit number, account number, serial number, or amount can have any or all of this information encoded by means of the machine of this invention to produce a completely encoded document.

Account number information will usually be printed at the time the checks are originally produced and before they are distributed to a bank customer, particularly for very active accounts. In some instances, however, it would not be efficient to apply the account numbers at the time the checks are printed, for example in accounts which have very low activity. Encoding the check with the account number would therefore be accomplished as a separate operation, and the machine of this invention is useful for this purpose. Amount information may be applied to the check or other document by recording apparatus which encodes the check or other document as an incident to a proving operation as disclosed and claimed in the machine of Monticello et al. Patent No. 3,018,721 of Jan. 30, 1962, assigned to the assignee of this application. Where an error is made in the amount or other information encoded on the document, the erroneous information may be removed and the machine disclosed in this application then used to insert the proper encoding.

An object of the invention is to provide an improved apparatus for encoding documents in high quality printing of characters which are used for mechanized information handling systems.

Another object of the invention is to enable high quality printing to be done on documents suitable for use in automated document handling systems regardless of wide variations in the thickness and surface characteristics of the paper being printed upon.

Still another object of the invention is to provide an interlock system for a character recognition encoder which insures that the information being printed on the document is properly registered and aligned.

Still another object is to provide a printing couple for a document encoding recorder which more evenly distributes the pressure load for the printing operation to minimize wear on the type members and other operative parts thereof.

An important aspect of the invention is that the printing couple utilizes the document being printed upon to establish the separation of the character wheels from the platen and thereby enable the printing couple to print with absolute uniformity on documents of widely varying thickness. The document itself, spaces the printing couple to a dimension of separation, and the platen presses the document against the type wheels with the same absolute pressure in a rolling line contact printing operation, regardless of the thickness of the document which has been inserted in the machine. Utilizing this principle, uniformly intense and uniformly embossed characters are printed on documents or sets of documents which may vary from tissue paper thin (0.002″) to multiple part forms including a number of sheets of paper and interleaved carbons having a total thickness equivalent to five sheets of check paper (0.020″).

As described in this specification, the invention is embodied in a portable machine which utilizes slidable levers to set character and symbol wheels which form one portion of a printing couple. A transfer ribbon, such as a ribbon carrying magnetic or magnetizable material dispersed in an adherent coating on a plastic or paper substrate, is interposed between the character wheels and the document to be encoded. Pressure is applied to the rear of the document by the other member of the printing couple, which is, in the embodiment described, a rolling contact member or platen which moves laterally across the character wheels to establish a line contact across each character serially. The rolling line pressure advances character-by-character and thereby transfers the material from the transfer ribbon to the face of the document.

Among the features of the machine disclosed in this application, the setting levers which control the character or symbol wheels can be locked in place for certain characters to be printed, and also can be locked in a blank position which will prevent the inadvertent movement of the setting lever which might cause an incorrect number to be encoded on a document.

Another feature of the machine lies in a document gauge which positions the document laterally to insure that coding entries are made in the proper field on the source document. This document gauge also contains mechanism to keep the document at its fully inserted position during the printing operation to insure perfect registration of the printing in the selected field where encoding is desired.

An additional feature resides in a restoring or keyboard clearing arrangement which returns the levers to a blank position for numbers set up in the keyboard, but does not affect symbols which may be used with check and bank document encoding. The keyboard clearing mechanism also includes a detenting arrangement to prevent the character wheels from being overthrown during their return to the blank position.

An additional feature of the lever setting keyboard resides in the provision of audit tapes to display in a window the number or symbol representing the position to which the lever and corresponding print wheel have been moved.

A more complete description of a machine embodying the invention follows in conjunction with the accompanying drawings, wherein:

FIG. 6 is a detail view illustrating the interlocks and the print wheel aligning mechanism;

FIG. 6A is a view of a portion of FIG. 6 with the parts in a moved position;

General construction

Figure 1:
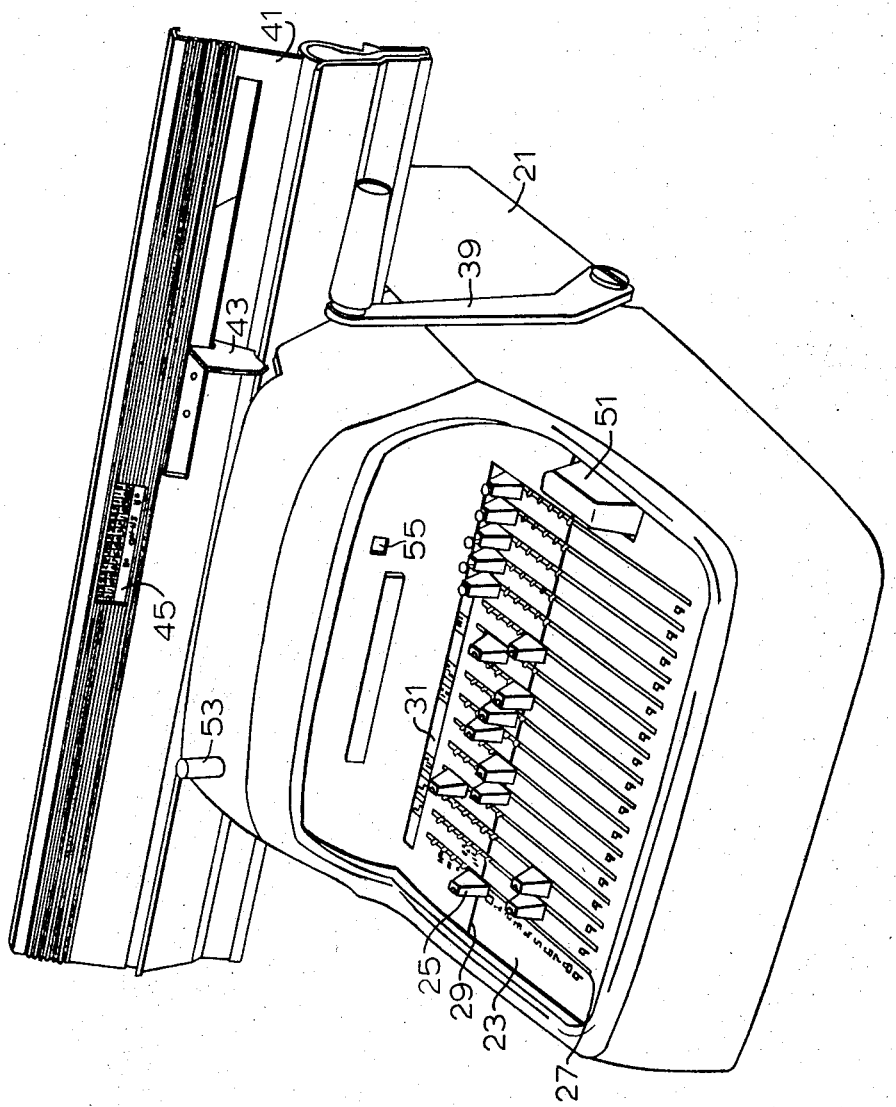
FIG. 1 is a perspective view of the exterior of the machine.

The general construction of the machine is illustrated in FIG. 1 and includes a case 21 which houses a recording apparatus in accordance with the present invention. A keyboard 23 contains a number of lever set keys 25 by means of which amount or number or symbol information is indexed into the printing unit of the machine. The keys 25 are movable to a plurality of predetermined positions in ordinal slots 27. In the embodiment shown, there are predetermined positions for the numerals 0 and 1 through 9, a blank position, and four or more symbol positions. A convenient arrangement illustrated in FIG. 1 has been found to be with numeral positions 0 and 1 through 9 on one side of the blank position 29, and the symbols on the other side of the blank position 29. The symbols above the blank position 29 illustrated in FIG. 1 are in the common machine language for magnetic ink character recognition (MICR) font, and represent amount, transit number, dash and "on us." The numerals 0 and 1 through 9 are emplaced on the keyboard 23 to the left of the predetermined positions, as shown in FIG. 1, to guide the operator in the proper positioning of the keys 25. The movement of any of the keys 25 acts through linkage which is explained hereinafter to position a corresponding print wheel in operative printing relationship with respect to a document to be encoded. If a lever set key 25 is moved toward the rear of the machine, one of the symbols, such as those illustrated in FIG. 1, will be selected. If a lever set key 25 is moved toward the front of the machine, that is to one of the numeral positions 0 or 1 through 9, the selected number will be indexed into the print wheel in position to be printed on the document.

An audit window 31 shows the machine operator which amounts or symbols are set up on the keyboard 23 and likewise what symbols or figures are in position to be printed by the machine for each order or space in which the machine can print.

The operation of the indicating devices for the audit strip window 31 is described in detail in conjunction with the explanation of FIG. 3 hereinafter.

A handle 39 on the right-hand side of the case 21 can be pulled forward, that is toward the front of the machine, in order to reset the lever set keys 25 which have been positioned forwardly to index numerals back to the blank position 29.

A document gauge 41 has a longitudinal slot adapted to receive an inserted document. A right-hand side tab or document stop 43 determines the right-hand margin between the edge of the paper and the printing position. A position indicating window 45 in the document gauge 41 indicates precisely the encoding fields in which the recording apparatus of this invention will print when the document is inserted and moved against the right-hand tab stop 43. The tab stop 43 and the indication of the field appearing in the window 45 are adjustable over the total lateral range in which characters are to be imprinted on the document. In the case of magnetic ink character encoding for United States banks, the document gauge is adjustable to cause the proper printing to appear in the 65 positions approved for magnetic ink character recognition coded information. The adjustment of the righthand tab stop 43 and the appearance of the field in which the print will occur in the indicating window 45 is discussed in more detail with respect to FIGS. 12 and 13 hereinafter.

When the proper symbol and numerical information is entered into the machine by operating the lever set keys 25 to a position opposite the desired symbol or number, and when a document to be encoded is fully inserted in the slot in the document gauge 41, the machine is caused to initiate a single printing cycle by pressing the motor bar 51. By means of interlocks to be explained later in conjunction with FIGS. 5 and 6 the motor bar 51 cannot be fully depressed, a cycle of the machine initiated unless a document is present in the document gauge and is fully inserted so that the type wheels are precisely opposite the place on the document where encoding is to appear.

Also on the exterior of the case, a ribbon advance lever 53 and a ribbon indicating window 55 are found. The ribbon advance mechanism is explained in detail in conjunction with FIG. 7, while the ribbon indicating window 55 and the operation of the indicator in connection therewith will be found in FIG. 10 hereinafter.

Number and symbol setting

Figure 2:
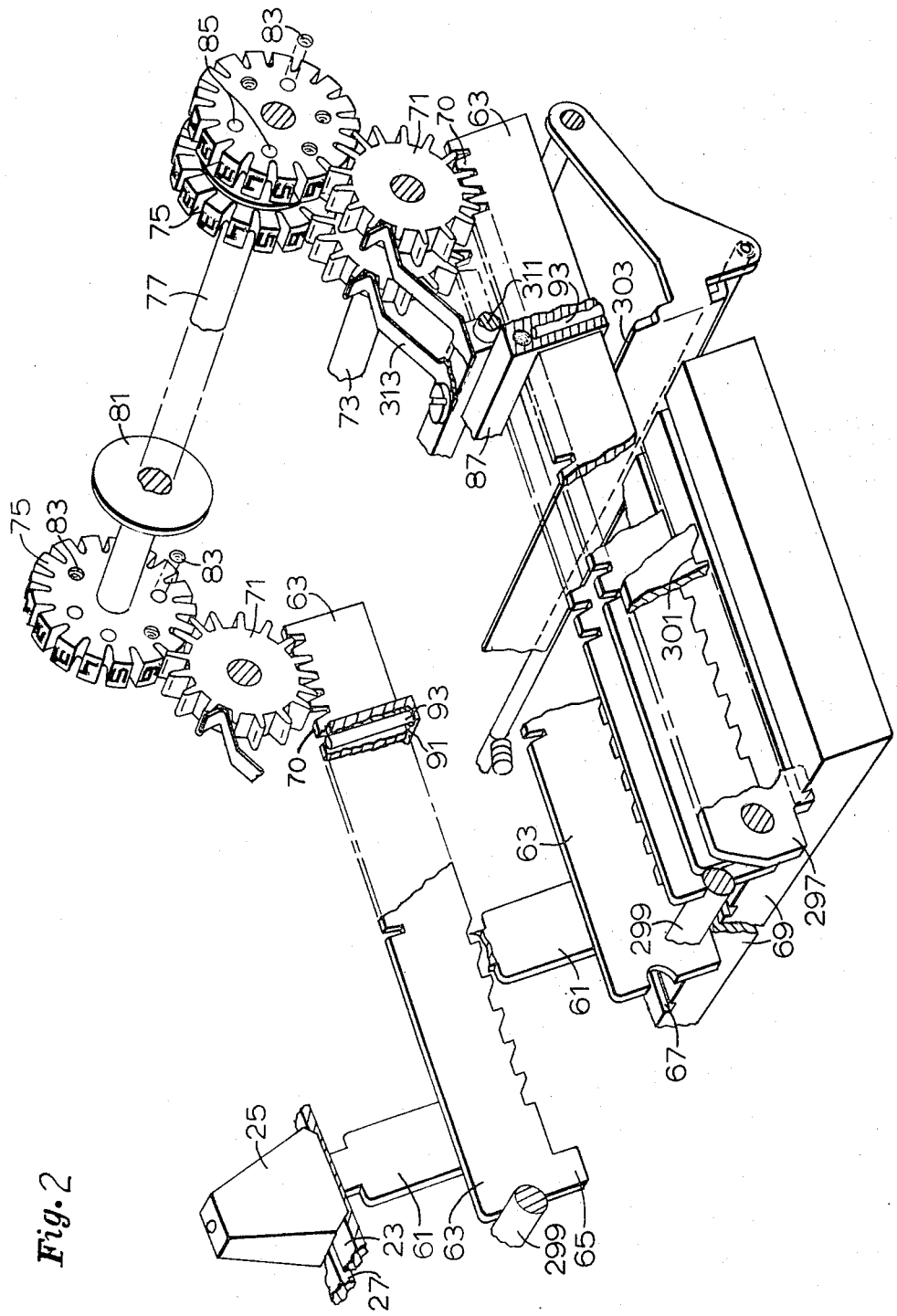
FIG. 2 is a perspective view showing the key lever setting of the character wheels.

Referring now to FIG. 2, which is a perspective view, partly in section, there is illustrated the cooperation of the key set lever 25 with the intervening mechanism necessary to position print wheels for printing. Each key set lever 25 is carried on the upper end of an actuator stem 61. Each actuator stem 61 is rigidly affixed to a corresponding actuator rack 63 which rack is constrained to slide longitudinally as controlled by the upstanding actuator stem 61. The upper end of the actuator stem 61 is positioned in one of the ordinal longitudinal slots 27 in the face of the keyboard 23. The longitudinal slot 27 thereby serves as a guide member for the actuator stem 61 in the direction of movement of the actuator racks 63. The lower end of each actuator rack 63 has a downwardly extending tang portion 65 which engages and is guided in a corresponding slot 67 in a keyboard base member 69. A number of parallel identical slots 67 are cut in the base 69, one for each ordinal printing position.

The rearward extension of the actuator racks 63 has teeth 70 on the upper surface thereof to engage an intermediate pinion 71. An intermediate pinion 71 is provided for each printing position, and each is in mesh with the rack 63 for that printing position. The intermediate pinions 71 are freely rotatable on a fixed shaft 73. The intermediate pinions 71 transfer the longitudinal displacement of the actuator racks to character-bearing print wheels 75, The character-bearing print wheels 75 are freely rotatable on a shaft 77. The print wheels 75, all carried by the same shaft 77, are spaced apart by shims or washers 81 interleaved between the print wheels 75, and ball bearings 83. Ball bearings 83 have a diameter slightly larger than the thickness of a print wheel 75 and are seated in drilled holes 85 in the print wheels 75. The character wheels 75 are thus not in frictional engagement with each other nor with the shims 81. Friction between adjacent orders of wheels is limited to the rolling ball bearing friction between the bearings 83 and the adjacent shims.

The actuator racks 63, in addition to being guided in the slots 67 in the base plate 69, are also guided near the point where they mesh with the intermediate pinions 71. A guide frame has a top member 87 and a bottom member 91 which are spaced apart by rigid side pieces (shown partly cut away in FIG. 2). The guide members are composed of needle rollers 93 which space apart the actuator racks 63 from each other in a low friction bearing. The needle rollers 93 are free to rotate around their axes and thereby offer minimum resistance to longitudinal movement of the racks 63, but constrain the same racks to maintain a parallel, precisely-spaced relationship.

Keyboard and audit window

Figure 3:
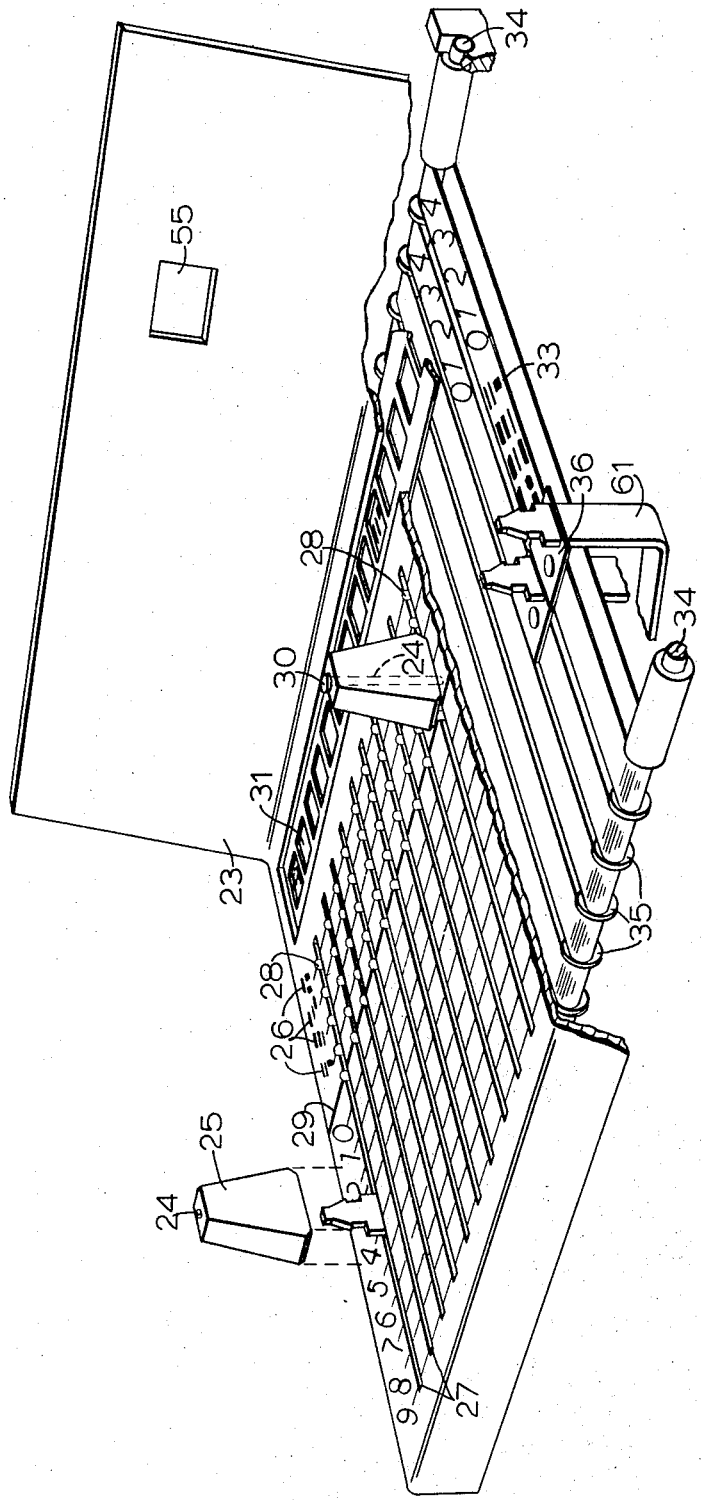
FIG. 3 is a perspective view of the keyboard, showing the arrangement of keys, key locks and audit tapes.

Referring now to FIG. 3, the keyboard and key set levers are shown in perspective, together with the arrangement of the audit windows 31 for each order of number or symbol which the machine can print. Each key set lever 25 has a hole 24 which extends completely through the key portion 25 substantially perpendicularly to the plane of the keyboard 23. Above the bank position 29, it will be noted that the characters representing symbols 26 have semicircular cutouts 28 in the sides of the slots 27. Pins 30 are provided which may be inserted through the hole 24 in the key set levers 25 to lock the longitudinally slidable key set levers 25 in the blank position 29 or in any of the symbol positions 26 for each and every order.

Each pin 30 extends through the key top 25 and engages the semicircular cutout 28 corresponding to the displacement of the lever 25 at the time the pin is inserted. Normally, it would not be desired to lock the keyboard keys 25 in any fixed numeral position, and therefore no cutouts 28 are shown for numeral positions below the blank position 29. Furthermore, the actuators and actuator stems 61 are restored from the numeral position to the blank position 29 by the restoring lever 39, and such operation would not be feasible if the keys 25 could be locked in a numeral position.

The actuator stem 61 for each order has affixed thereto a tape 33. The tape 33 has printed at spaced points therealong the character corresponding to the numerals and symbols which may be set up on the type wheels 75. The spacing and order of the characters on the tapes 33 are arranged in such fashion that the number which is indexed by movement of the key lever 25 to be set up on the type wheels 75 also appears on the tapes 33 in the audit window 31 for each order. The tapes 33 may conveniently be made in the form of an endless belt, for example of plastic material or other web material, and looped around axles 34 at each end of the limit of excursion of the actuator stem 61. Separators 35 are spaced along the axles 34 to provide an individual track for each tape 33.

In the embodiment shown in FIG. 3, the tapes 33 are joined by a rivet and plate arrangement, with the plate 36 having an aperture or slot which fits over the actuator stem 61 to secure the plate 36 and the tape 33 to each associated stem 61. When the actuator stem 61 is moved in its associated slot 27, the upper portion of the tape 33 moves in the same direction as the actuator stem 61. The lower half closes the loop and moves in the opposite direction but is not visible through the audit window 31 or through any other portion of the keyboard.

Figure 4:
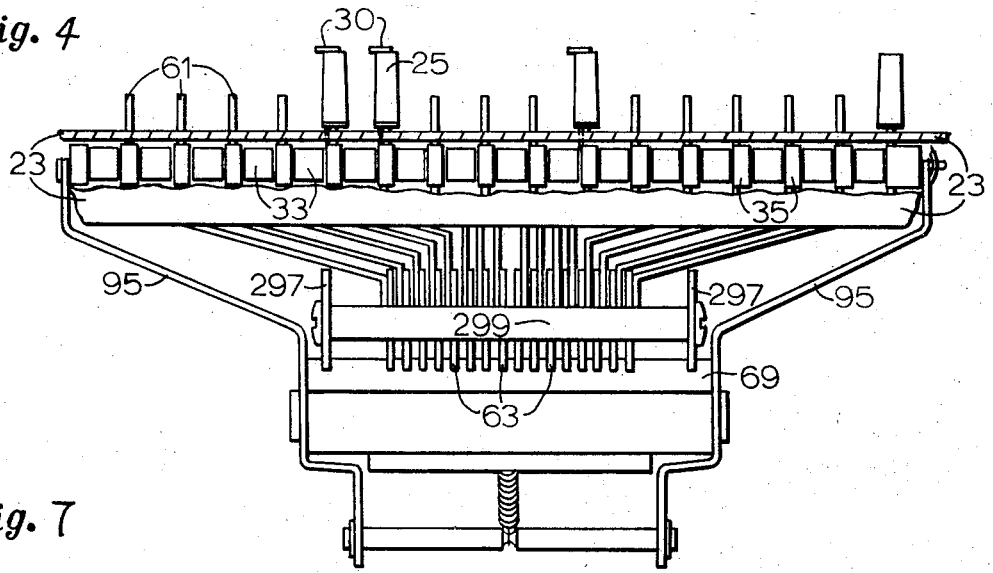
FIG. 4 is an end view of the keyboard and lever setting arrangement.

FIG. 4 is an end view of the keyboard and key set mechanism illustrated in perspective in FIGS. 2 and 3. From this view, the interrelation of the keyboard 23, the actuator stems 61 which extend therethrough, and which also connect to the racks 63, can be quite clearly seen. It can be observed that the racks 63 are spaced apart by the amount that the adjacent orders to be printed are spaced, while the keyboard 23 has its keys 25 spaced apart by a comfortable finger distance. The actuator stems 61 are bent to provide the necessary offset in distance between the rack 63 and its associated stem 61. The keyboard base 69 has secured to each side of it a keyboard side frame 95. The entire keyboard mechanism is cradled within the base 69 and the keyboard side frames 95, and the keyboard 23 may be conveniently fastened to the side frames 95 by means of screws or other suitable fasteners.

Machine release

Figure 5:
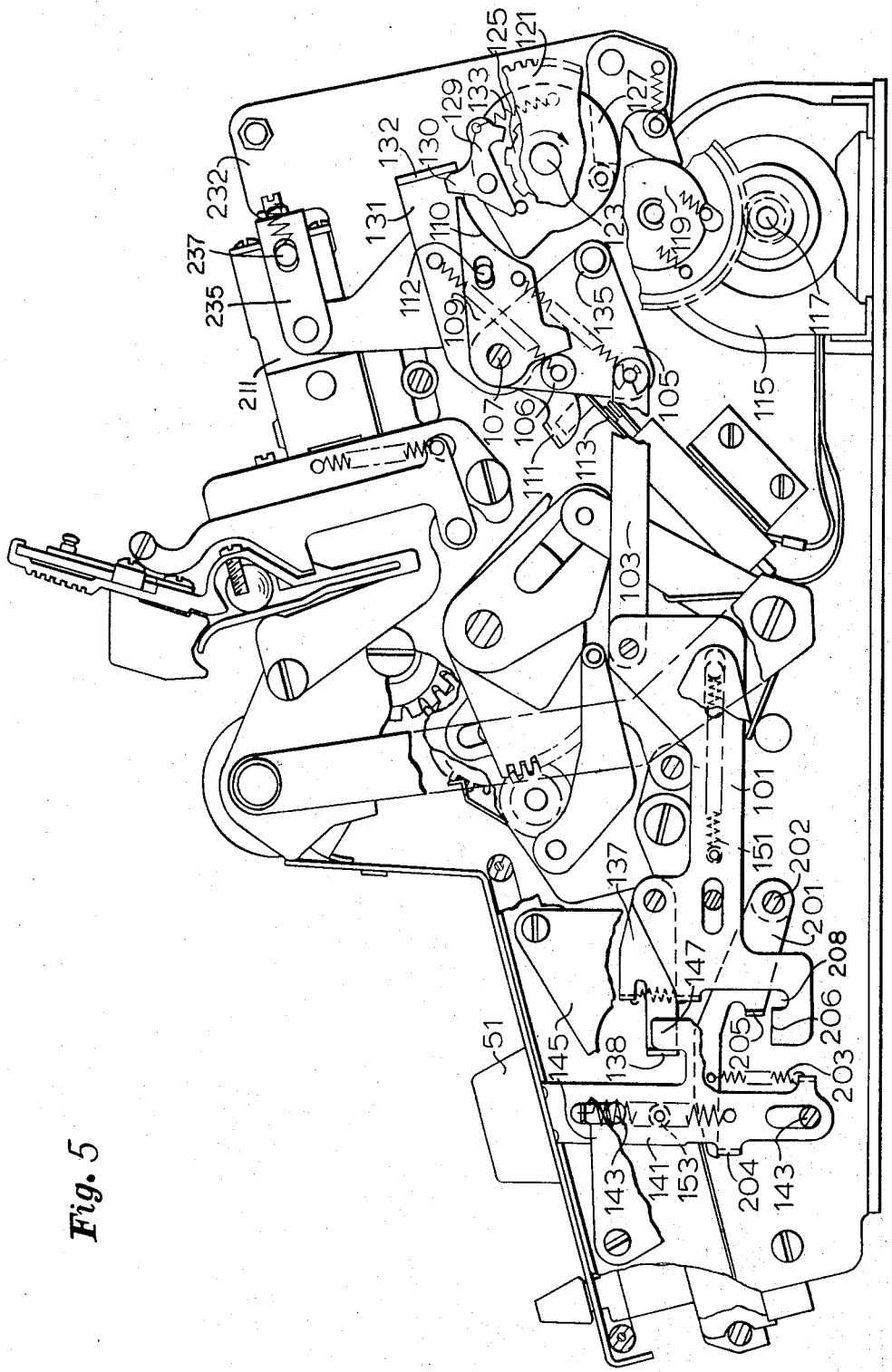
FIG. 5 is a right side elevation of the machine.

FIG. 5 is a right-hand side view in elevation, in which some of the parts are shown partially cut away. Among the machine elements and mechanisms which are shown in this view are the machine release mechanism or trip off, the actuator rack restoring mechanism, the motive power train including a single revolution clutch, and certain features of the document gauge.

A cycle of the machine is initiated by releasing the cycle trip slide 101 for rearward travel. This rearward travel of the slide 101 (toward the right in FIG. 5) is transmitted by means of the link 103 to rock the bellcrank lever 105 counterclockwise about its axle 107. Three additional bellcrank levers are carried on the same axle 107. The counterclockwise movement of the bellcrank 105 causes a corresponding counterclockwise motion of bellcrank 109 through the action of the stud 106 which is carried on the bellcrank 105. The counterclockwise rotation of bellcrank 109 brings about two separate results. One is the pivoting of bellcrank 111 through the agency of a stud 112 affixed to one end of the bellcrank 111. The counterclockwise rocking of the bellcrank 111 closes an electrical switch 113 which controls an electric motor 115. When the electrical switch 113 is closed by the counterclockwise rocking of the bellcrank 111, the electric motor 115 is brought into operation and through its output shaft 117 and a well known overload clutch 119 drives a gear 121 to provide power selectively through a single revolution clutch mechanism to a main driveshaft 123.

The gear 121 is normally freely rotatable on the main driveshaft 123 but carries a drive plate 125 on its left side (behind as seen in the partially cut-away portion of FIG. 5) and therefore when the motor 115 is energized, the drive plate 125 is driven clockwise on the shaft 123 by the gear 121. A cam 127 which is secured to the driveshaft 123 carries a drive pawl 129 having a downwardly extending nose which is adapted to be engaged between adjacent lugs on the drive plate 125.

An additional bellcrank lever 131 carried on the same axle 107 which supports bellcranks 105, 109 and 111 has a rightwardly extending lug 132 which engages a vertical portion on the driving pawl 129 to hold the pawl 129 in a counterclockwise position and thereby out of engagement with the drive plate 125. The drive pawl 129 is urged by a spring 133 in the direction to engage the drive plate 125. As shown in the position of the mechanism in FIG. 5, with the bellcrank 131 in its clockwise position, the drive pawl 129 and the cam 127 affixed to the main driveshaft 123 are held against rotation. When the slide 101 moves rearwardly, the bellcrank 105 rotates counterclockwise and by means of the stud 106 working against a downwardly extending tang on the bellcrank 131, counterclockwise rotation of the bellcrank 131 is effected, and the lug portion 132 which engages the pawl 129 is cammed upwardly (counterclockwise) out of engagement with the pawl 129, and the spring 133 urges the pawl 129 into engagement with the drive plate 125. The same counterclockwise rotation of bellcrank 105 also rotates bellcrank 109 through the agency of the stud 106. This accomplishes the closing of the electrical switch 113 by means of the bellcrank 111 and its actuating stud 112, energizing the electric motor 115. The motor output shaft 117, overload clutch 119 and the gear 121 and drive plate 125 bring the drive pawl 129 and the cam 127 into clockwise power operation.

Near the end of the rotation of the cam 127, the high portion on the cam engages a roller 135 on the right-hand end of bellcrank 105 which serves to reset the slide 101 to its home position. This same counterclockwise rotation of bellcrank 105 under the influence of cam 127 also allows bellcrank 131 to rotate clockwise and place the lug section 132 in the path of the vertical portion on the pawl 129. The lug 132 will pivot the pawl and disengage pawl 129 from the drive plate 125 and also hold the main driveshaft 123 against further rotation.

The clockwise rotation of bellcrank 105 would allow bellcrank 109 to open the contacts of the electrical switch, since the stud 112 would rotate clockwise with bellcrank 109. Bellcrank 109, however, is in the same plane as the driving pawl 129. Bellcrank 109 is maintained in its counterclockwise position by the high portion 130 on the drive pawl engaging the circularly curved portion 110 on the rightwardly extending end of bellcrank 109.

When the high portion 130 of the drive pawl 129 reaches the end of the circular portion 110 of bellcrank 109, bellcrank 109 is rotated clockwise by its return spring, which movement carries the stud 112 in a clockwise direction and thereby allows the bellcrank 111 to release the switch 113.

*Interlocks*

For the purpose of describing the interlocks in conjunction with the motor bar 51 to effect release of the cycle trip slide 101, reference will be made now to both FIGS. 5 and 6. Carried on the cycle trip slide 101 is a pivoted latch 137 having a tang portion 138. The motor bar stem 141 is mounted by means of studs 143 to have vertical movement. The studs 143 are actually carried on an auxiliary side frame 145 to space the motor bar 51 and its motor bar stem 141 properly with respect to the remainder of the keyboard. For clarity and simplicity the auxiliary side frame 145 is shown cut away in FIG. 5 to expose the mechanism described.

An upstanding pawl 147 on the motor bar stem 141 serves to hold the cycle trip slide 101 in a forward (that is to say, toward the left in FIG. 5) position. For the latching arrangement 138, 147 to be released, the motor bar 51 and the motor bar stem 141 must travel downward to allow the upstanding pawl 147 to clear the latch tang 138 so that the trip slide 101 will be urged to the right under the action of a spring 151.

FIG. 6 shows the interlock mechanism which cooperates with a stud 153 which is carried on the stem 141 to prevent the cycle trip slide 101 from being released unless a document is properly inserted in the machine. A bellcrank 155, slotted at one end to embrace the stud 153, is pivoted on a shaft 157 journaled in the side frame of the machine. It is preferred to make the bellcrank 155 in such fashion that one extending arm is adjustable with respect to the angle of the arm at the other end. This may conveniently be done by an eccentric screw 159. A stud 161 at the end of the bellcrank 155 opposite the motor bar stem engages a bail sensing member 163. Bail sensing member 163 is constrained to move in the direction of a slot 164 and as directed by the limited arcuate movement of the stud 161 when the motor bar 51 is depressed.

At the top of FIG. 6 a document 165 is shown inserted into the document gauge 41. Before the document 165 reaches its full allowable depth of insertion, it meets a document sensing plate 167 which is pivoted about the print wheel shaft 77. The normal position of plate 167 without a document inserted into the document gauge 41 is that shown in FIG. 6. An aligning bail 171 is carried on a lever 173 which is pivoted around a shaft 175. The lever 173 has a nose portion 177 which extends past the aligning bail 171 into operative position with respect to a stud 179 which is carried by the bail sensing member 163. It will be seen from an inspection of FIG. 6 that the motor bar stem 141 will not be allowed to travel to its full depression as long as the nose 177 of the pivoted lever 173 holds down the stud 179 on the bail sensing member 163.

The document sensing plate 167 has a step 181 which prevents the aligning bail 171 from going into the grooves between the character types on the wheel 75 until the sensing plate 167 is rotated clockwise to remove the step from the path of the aligning bail 171.

It is apparent that, even though the step 181 has been removed from the path of the aligning bail 171, the motor bar 51 will not be released unless the grooves between adjacent printing type members on the wheels 75 have been substantially aligned by the lever set keys 25.

FIG. 6A is a partial view of the document sensing arrangement of FIG. 6 showing the document sensing plate 167 in its moved position when the document has been fully inserted. It will be noted that the sensing plate 167 has been rotated clockwise the precise amount necessary to allow the aligning bail 171 to clear the step 181 and thereby enter the grooves between adjacent character types in the type wheels 75. A counterweight 183, which is conveniently an extension of the sensing plate 167, returns the sensing plate 167 to its normal position shown in FIG. 6 when the document is removed. The aligning bail 171 has a wedge shape to its leading edge which is inserted in the grooves between adjacent character types in the type wheels 75. This wedge-shaped leading edge acts upon the sides of the grooves between the character types to rotate them slightly if necessary to bring them into perfect alignment when the aligning bail 171 is fully seated.

There are two sensing plates, one at each end of the set of character wheels. Both sensing plates 167 must be rotated by the inserted document in order to remove both steps 181 to allow the aligning bail 171 to go into the space and also allow the bail sensing member 163 to travel its full distance and thereby trip the slide mechanism of FIG. 5.

Referring back now to FIG. 6 again, a document holddown arrangement which has been found to be very satisfactory is illustrated and will be explained. A channel in the document gauge 41 has two or more balls 184 spaced along the channel. The edge of the document is inserted from the top in FIG. 6. The balls 184 are of heavy material, and in an actual embodiment are smooth steel balls identical with those used in ball bearings. When the document 165 is fully inserted to the bottom of the document gauge 41, the balls 184 by their weight and wedging action against the channel and the document 165 act to prevent the document from bouncing or backing up. Also, this hold-down arrangement is found to be of great value with lightweight documents 165 which otherwise would not keep the document sensing plate 167 in its rotated position to allow the machine to be tripped.

When the cycle trip slide 101 is released and the main driveshaft 123 energized as described earlier, a cam 185 affixed to the main driveshaft 123 makes one clockwise rotation. A cam follower 187 affixed to one end of the pivoted crank 189 follows the surface of the cam 185 urged by a spring 191. When the main driveshaft has rotated a few degrees, the roller 187 moves downwardly, urging the left-hand end of pivoted crank 189 upwardly. This movement of the left-hand end bears against a stud 193 on the pivoted lever 173 to maintain the aligning bail 171 seated in the grooves between adjacent types until the printing cycle has been completed. The pivoted lever 173 is cammed out of engagement near the end of the rotation of cam 185 by a projection 195 which engages the adjacent bottom portion 197 of the pivoted lever 173.

Referring now to FIG. 5, the cycle trip slide 101 is released by the depression of the motor bar stem 141 and the downward movement of the pawl 147. Near the end of rotation of the cam 127, the roller 135 on the bellcrank 105 will be bodily removed clockwise as explained above. This clockwise movement of the crank 105 is transmitted through the link 103 to move the cycle trip slide 101 back to the left in FIG. 5 and to reset the pivoted latch 137 behind the pawl 147. If the motor bar 51 is held depressed, the pivoted latch 137 and the tang 138 would not engage the upstanding pawl 147. To prevent the machine from going through repeating cycles without being tripped intentionally by the operator for each cycle, a repeat prevention latch is included. A detent plate 201 is pivoted at its right-hand end on a projection 202 and is urged in a counterclockwise direction by a spring 203, the other end of which is secured near the bottom end of the motor bar stem 141. The left-hand end of the detent plate 201 rides on a turned projection 204 on the motor bar stem 141. As the motor bar stem 141 is depressed, the detent plate 201 follows the stem 141 until an abutment 205 encounters the flat portion 206 on the cycle trip slide 101. Further depression of the motor bar stem 141 will then tension spring 203.

Assuming that the operator keeps the motor bar stem depressed, when the cam 127 restores the cycle trip slide 101, the abutment 205 will be spring pressed against the flat portion or land 206 when the slide 101 moves to the left in FIG. 5. The cycle trip slide 101 is returned past the home position which is shown in FIG. 5, allowing the abutment 205 to fall into the notch 208 to the right of the land 206. This detents the cycle slide in its left-hand position. The machine cannot be released for another cycle until the motor bar goes to the top of its travel and assumes the home position shown in FIG. 5. The upstanding pawl 147 engages the tang 138 on the pivoted latch 137, and all of the mechanism is ready for another cycle.

*Printing mechanism*

Figure 7:
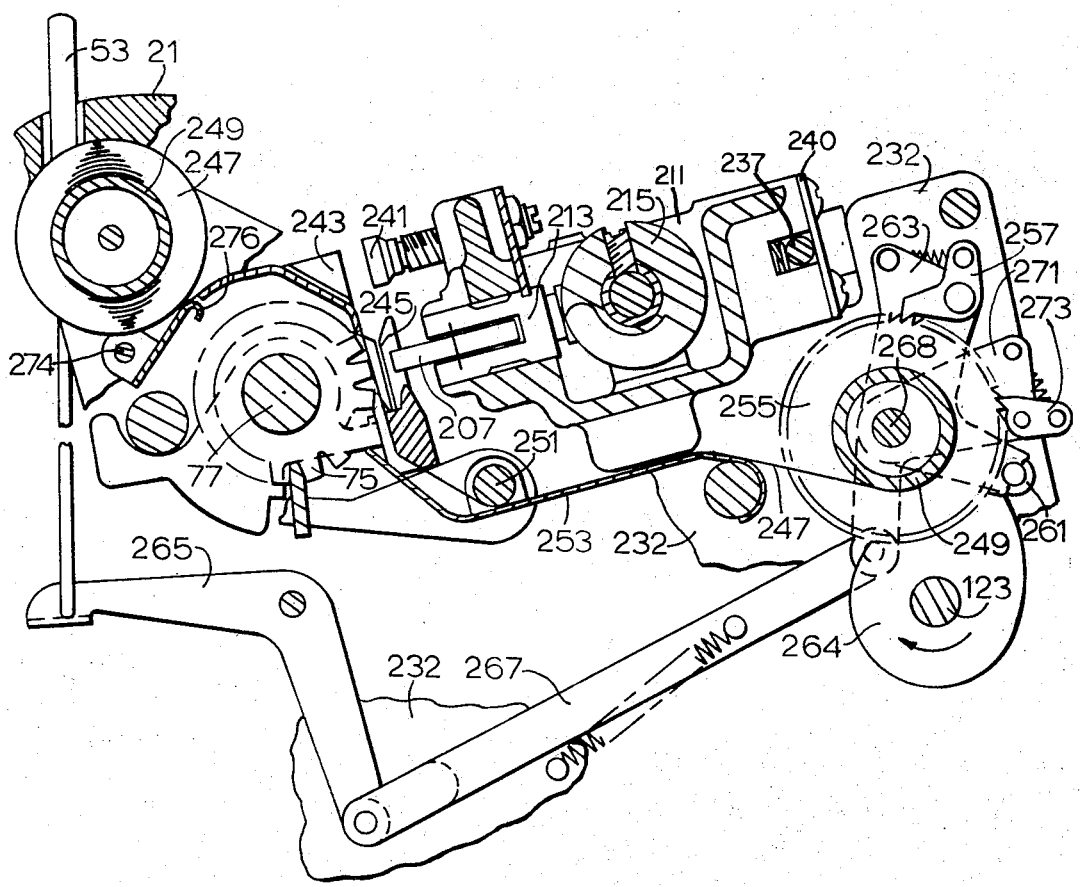
FIG. 7 is a right-hand side view of the printing couple.
Figure 8:
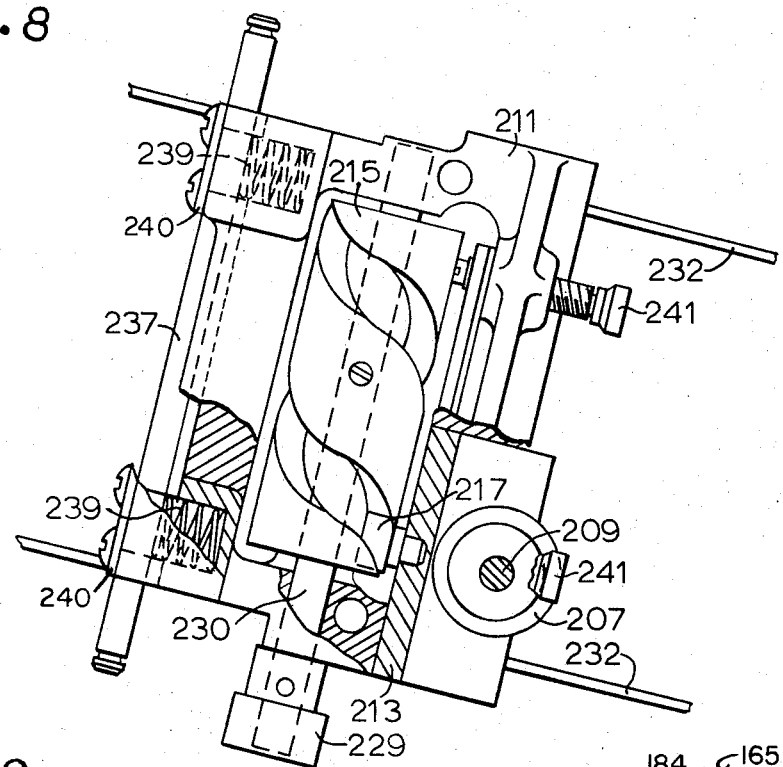
FIG. 8 is a top view of the printing couple illustrating the platen drive.
Figure 9:
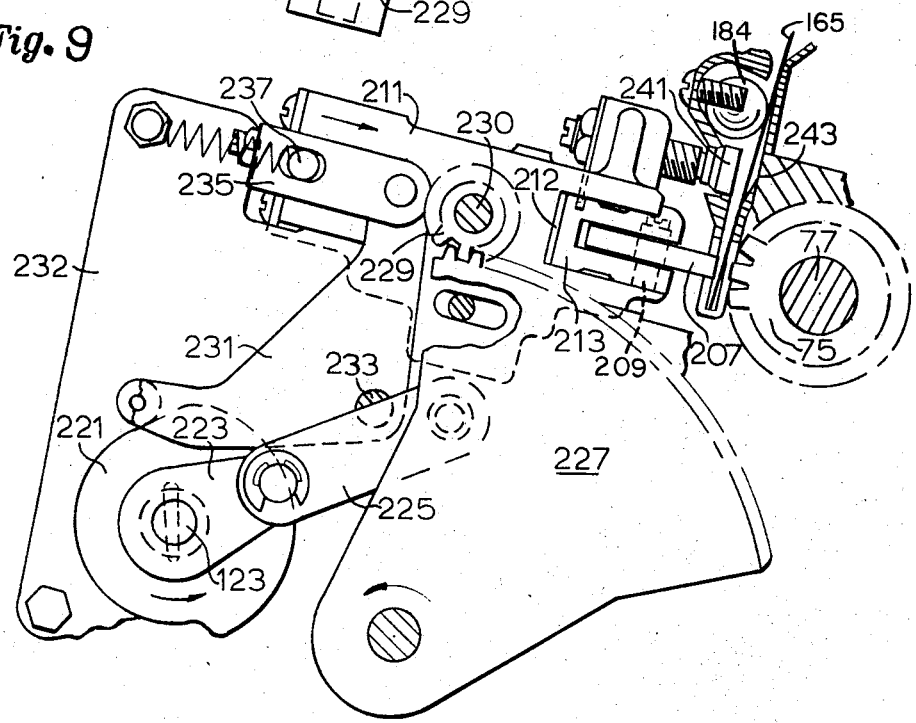
FIG. 9 is a left-hand side elevation of the printing couple and printing couple drive.

Referring now to FIGS. 7, 8 and 9 together, the operation of the printing couple of the machine will be explained. FIG. 7 is a right-hand side view, partly in section, while FIG. 9 is a left-hand side view showing many of the same elements. FIG. 8 is a top view illustrating particularly the platen drive. In FIG. 7 the character wheels 75 carried on the shaft 77 have one line of character types positioned opposite the line of travel of a rotary platen 207. The platen 207 rotates around the axle 209 (best seen in FIGS. 8 and 9) and effects printing by moving transversely across the document to establish a rolling line contact character-by-character with the type wheels 75. The platen assembly is carried by a yoke member 211 which may be in the form of a four-sided member constituting a frame or carriage. The forward side of the yoke has a channel 212 throughout the length of that side, or at least for the distance that the platen roller is required to move to contact all of the characters in the line of print wheels 75. Movable in the channel 212 is a platen carrying block 213 in which the axle 209 is journaled. The motion of the platen carrying block 213 and thus the platen 207 is controlled by helical worm 215 which is best seen from the top in FIG. 8. A stud 217 which is secured in the block 213 but whose cap is rotatable, is seated in the helical worm 215. When the machine is tripped into operation the worm 215 is caused to make the proper number of revolutions to carry the stud 217 in the associated platen block 213 and thereby roll the platen 207 laterally across the face of the character type.

The power drive for the printing couple is illustrated in FIG. 9. When the machine is released, i.e., permitted to cycle, the main driveshaft 123 turns in a counterclockwise direction (as seen from the left-hand side of the machine according to FIG. 9). Carried on the shaft 123 is a cam 221 and a crank arm 223. The crank arm 223 is linked by a pitman 225 to a sector gear 227. The sector gear 227 is engaged with a pinion 229 which is secured to the shaft 230 by which the helical worm 215 is also carried. As the crank arm 223 progresses in a counterclockwise direction, the sector gear 227 is rotated counterclockwise until the crank arm 223 reaches its maximum excursion to the left in FIG. 9, at about 210° to 220° of the main camshaft rotation. Beyond this point, the crank arm 223 will return the sector gear 227 in a clockwise direction to its starting position as shown in FIG. 9. Reference may be had to the timing diagram in FIG. 11. Counterclockwise displacement of the sector gear 227 is shown upwardly in the timing diagram.

When the printing cycle is initiated the yoke or carriage 211 and the platen 207 must be brought into position for the platen 207 to contact the printing types on the character wheels 75. This movement is under the control of the cam 221 operating on the crank 231 which is pivoted to the side frame 232 on a bearing 233. The increased radius on the cam 221 determines the rocking movement of the crank 231 for imparting motion to the yoke or carriage 211.

Figure 11:
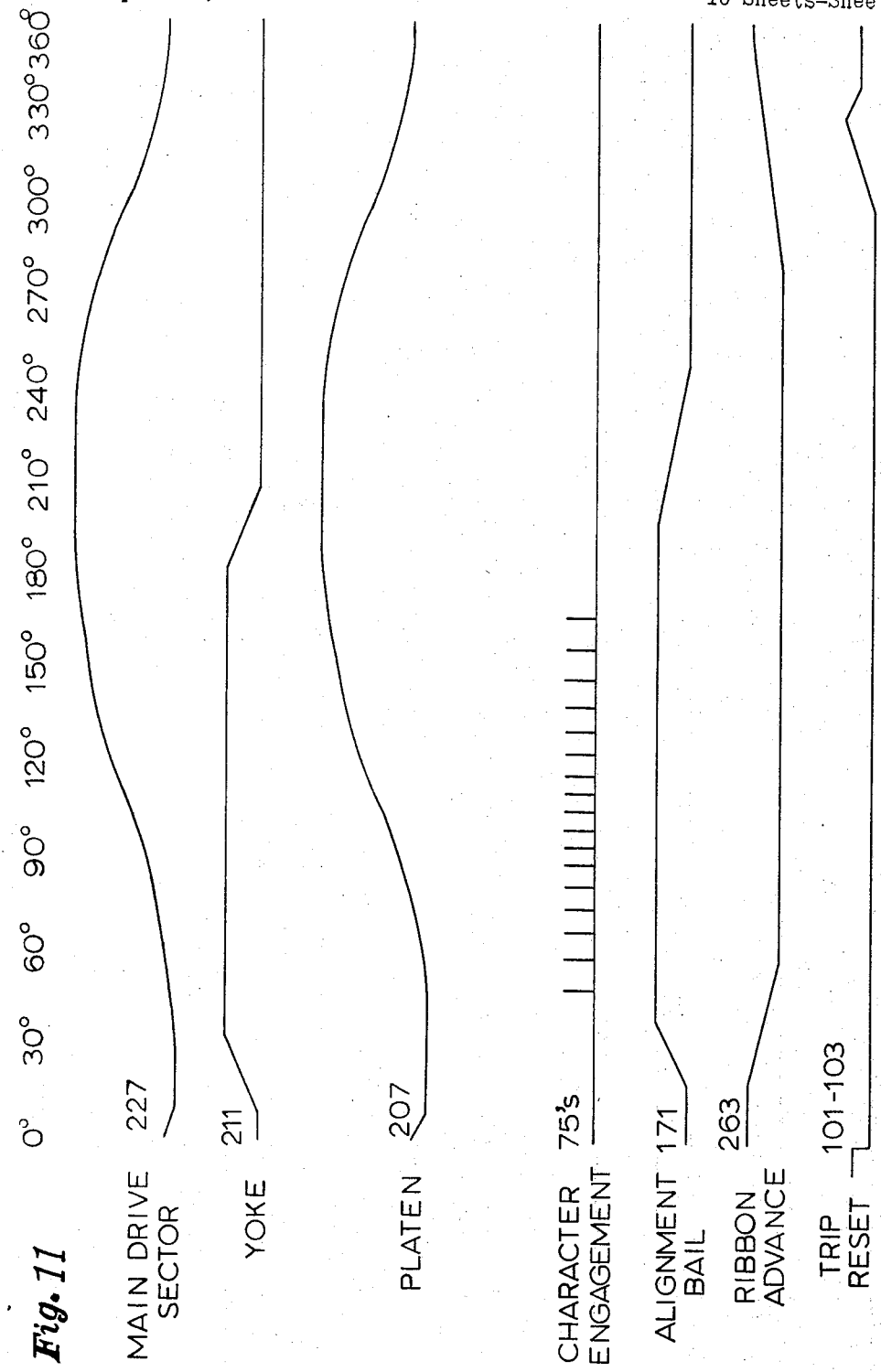
FIG. 11 is a timing diagram illustrating the timing of mechanism during a cycle of the machine.

The movement of the yoke 211 toward the character wheels 75 occurs very early in the cycle of the machine, as can be seen from the inspection of the cam 221 and of the timing diagram for the yoke 211 as shown in FIG. 11. Shortly after the middle of the cycle, that is from about 185° to 210° rotation of the main shaft 123, the yoke is moved rearwardly so that the platen 207 is taken out of engagement with the character type wheels 75, and the platen block 213 and therefore the platen 207 are returned to their starting retracted position. Therefore platen 207 does not print on the return stroke.

The pressure which the platen 207 exerts on the character wheels 75 in the direction of the center of the shaft 77 is a function of how far forward the platen 207 moves under the control of the crank 231. The crank 231 moves the yoke 211 by means of a link 235 on each side of the yoke 211. The links 235 engage a cross shaft 237 and transmit the rotation of the crank 231 into movement of the yoke 211 in the direction of an arrow at the top of the yoke in FIG. 9. The force exerted by the shaft 237 is applied to the yoke 211 through means of springs 239 which are quite stiff to provide the printing pressure as translated from a positive displacement. Backing plates 240 couple the shaft 237 to the carriage assembly, and it is apparent that in its forward direction of movement the shaft acts through the springs to move the carriage forwardly and yieldingly press the platen roller against an inserted document and that in its rearward direction of movement the shaft acts on the backing plates to retract the carriage assembly. An adjustment screw (not shown) is provided for each spring so that the tension can be adjusted to the proper value and made even on both sides of the yoke 211. This resilient linkage in the printing couple also has further value in reducing wear on the print wheels 75. During the forward and rearward movement of the yoke or carriage, it is apparent that the pinion 229 will roll slightly on the teeth of the sector 227 thus maintaining a continuing driving connection with the worm gear 215 and the main drive shaft 123 regardless of the position of the yoke.

At the forward end (right-hand end in FIG. 9) of the yoke 211, two threaded gauges 241 extend from the yoke and are adapted to engage an anvil portion 243 attached to the frame 232 to form calipers. As the yoke 211 comes forward under the control of the crank 231 and link 235, the caliper gauges 241 will establish a separation for the yoke 211 and the platen 207 from the character wheels 75 which will vary depending upon the thickness of the document. If a thin document is to be printed upon, the caliper gauges 241 allow the yoke 211 and platen 207 to be arrested with the platen 207 and print wheels 75 at their opposing positions to cause proper printing pressure to be exerted. If a thicker document or a multiple part form is inserted, the caliper gauges 241 will space the yoke 211 and platen 207 apart by the precise additional amount of the thickness of the documents themselves to enable the machine to print with the selected controlled impression in spite of a wide variation in thickness of the document.

In an actual embodiment it has been found that the printing couple just described will produce a print quality which meets the most rigid specifications for machine processed documents even when printing is effected on different documents which vary in thickness over a range of from 0.002 to 0.020 inch. The range of thickness is dependent upon the length and linearity of the displacement versus compression curve of springs 239, as long as allowable excursion space is provided for the shaft 237 to move with respect to the link 235.

In the embodiment of the machine mentioned, a restricted throat 245, shown in FIG. 7, or slot was provided at each end of the assembly of character wheels 75. This slot 245 had a width of 0.020 inch to limit the thickness of documents inserted in the printing couple. This limit on the thickness of items to be encoded was found to be entirely adequate to handle not only single sheet or card checks, tickets and forms but also multiple part forms. Items of greater total thickness, which might adversely affect the character types on the wheels 75, cannot then be inserted in the printing couple.

Ribbon mechanism

The mechanism for advancing the transfer ribbon is also shown in FIG. 7. A transfer ribbon 247 wound in spool form is carried on a pay-out axle 249. The ribbon 247 is sufficiently wide to extend entirely across all of the character wheels 75, and after each printing impression the ribbon 247 is advanced one whole line to present a new transfer surface toward an inserted document and in front of the characters set up on the print wheels 75.

The ribbon 247 after passing between the print wheels 75 and the platen 207 is passed under shaft 251 along a guideway 253 and is wound on a take-up spool 255. The take-up spool 255 is driven counterclockwise (as seen in FIG. 7) by an amount necessary to advance a new transfer surface near the end of each printing cycle. A pawl 257 is driven from a cam follower 261 actuating the crank 263 from the rotation of the cam 264 on the main drive shaft 123. Because the pawl 257 is pivotally connected to the crank 263 and resiliently urged into teeth on the rim of the ribbon spool 255, the spool will be positively driven in the counterclockwise direction, and the pawl will make an idle movement in the clockwise direction. As will be apparent from an inspection of FIG. 11, the advance to the new space on the transfer ribbon 247 occurs in the machine cycle after the printing stroke has been completed.

The ribbon may also be fed from the pay-out shaft 249 to the take-up spool 255 manually. In certain types of transfer ribbons, particularly if the transfer materials is left exposed to the atmosphere for several days without use, it is desirable to present a fresh, unexposed surface between the print wheels 75 and the platen 207. A ribbon advance lever 53 extends through the outside of the case 21, and has a portion which contacts a bellcrank 265. The bellcrank 265 has one end pivotally connected to a pitman 267 which controls another crank 271 pivoted about the ribbon spool shaft 268. The other end of the crank 271 includes a pawl 273 also resiliently biased into engagement with the teeth on the rim of the ribbon spool 255. When the ribbon advance lever 53 is depressed, the pawl 273 will be rotated counterclockwise, winding the ribbon on the take-up spool in the same manner as is accomplished by the automatic ribbon advance described above, except that the manual advance by means of the ribbon advance lever 53 enables the operator to advance the ribbon at will, as well as to wind the take-up spool to properly position the ribbon when a new ribbon is threaded into the machine.

The ribbon 247 contains a transferable combination of ingredients carried on a substrate. In case the symbols and numerals are to be encoded or are to be imprinted in magnetic or magnetizable material, magnetic material such as magnetic iron oxide will be dispersed in an adherent coating, which may be for example a combination of cellulose or other binder with certain oils and oleates. The essential characteristics of such a transfer ribbon are that the magnetic pigment is sufficiently concentrated and of the proper particle size to produce the change of flux necessary to induce a signal of sufficient magnitude in the scanning device of the automatic character recognition machinery to cause the document to be properly recognized. In addition, the coating must not rub off, flake, or otherwise deteriorate with ordinary handling. Except for the electrical and magnetic properties, similar requirements would be necessary for ribbons to be used with optical character recognition systems. Clean, smudgeproof, tightly adhered solid characters on the document are necessary for automatic document handling systems in which the encoding is to be read by machine.

Figure 10:
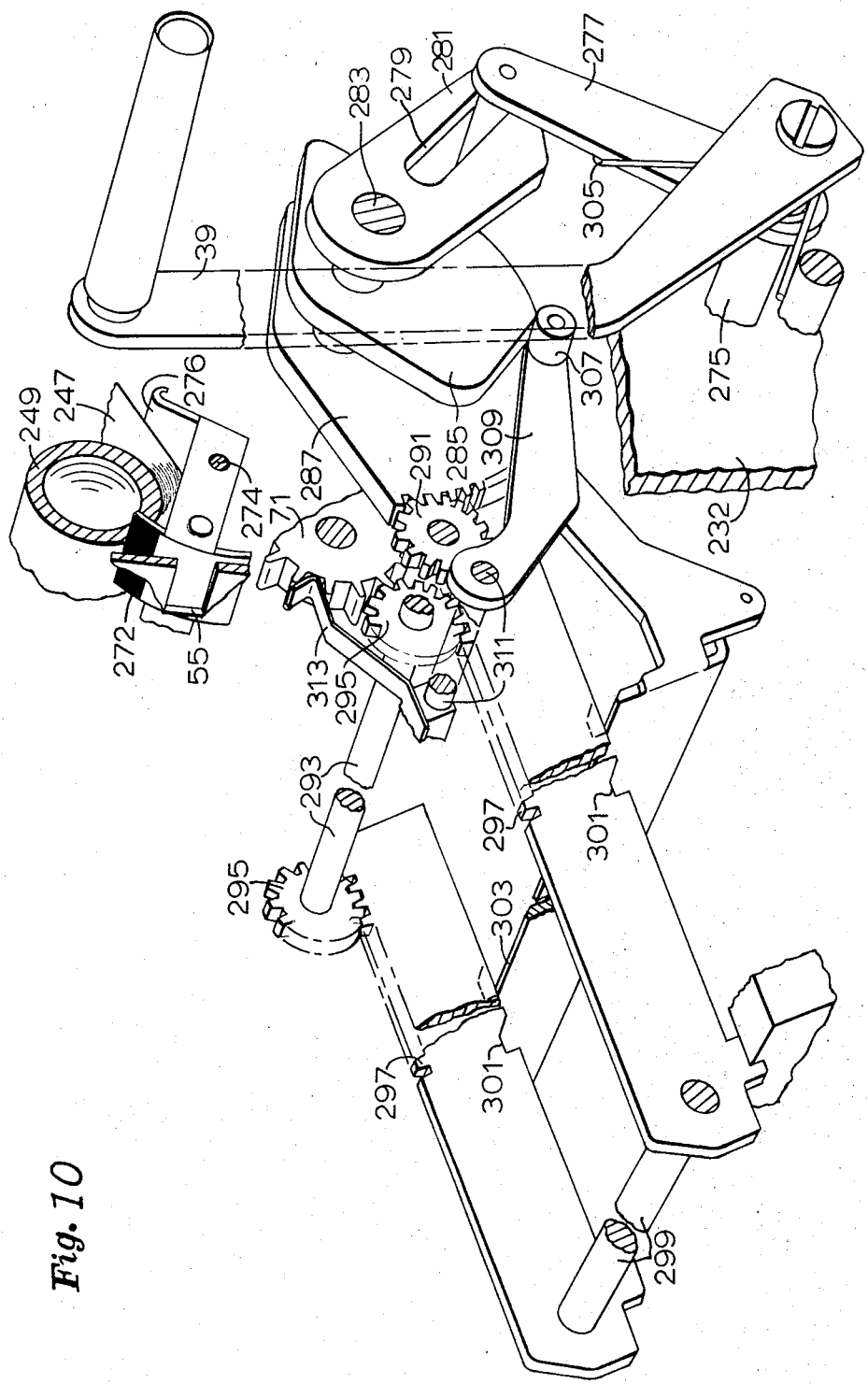
FIG. 10 is a perspective view of the keyboard restoring arrangement, illustrating the overthrow prevention device.

A ribbon use indicator arrangement is also provided. The mechanism is best seen in FIG. 10, although it is partly shown in an elevation in section in FIG. 7 and its appearance on the outside of the machine is shown in FIGS. 1 and 3. Behind the window 55 in the upstanding part of the keyboard plate 23 is a flag 272 which is carried on an arm pivoted around an axle 274. The flag 272, the axle 274, and the rearwardly extending feeler 276 form a crank. The end of this crank with the flag 272 is slightly heavier than the other end with the feeler 276. The force of gravity causes the flag 272 to force the rearwardly extending feeler 276 upwardly against the roll of ribbon 247. As the ribbon is depleted, the feeler 276 will be allowed to move farther toward the pay-out axle 249. This causes the flag 272 to rotate counterclockwise and expose its upper portion which is colored in a contrasting fashion to its lower portion to indicate to the operator through the window 55 that the ribbon is depleted.

Character and symbol resetting

Referring now to FIG. 10, the arrangement for restoring the print wheels 75 and their associated mechanism back to the blank position will now be explained. Reference may also be had to FIG. 2 from time to time for purposes of explanation or clarification of this mechanism.

In FIG. 10 the handle 39 which controls the restoring mechanism is shown pivoted to the side frame 232 by means of a stud 275. Forming a rigid crank arm with the handle 39 is the lever 277 which has a lateral extension at its outer end captive in a slot 279 in a cam plate 281.

The cam plate 281 is rigidly affixed to a shaft 283 which is journaled to the side frame 232 (this connection is not shown). Also rigidly attached to the shaft 283 are two additional plates: the first is a cam 285 and the second is a sector gear 287.

When the handle 39 is pulled toward the front of the machine, that is to the left in FIG. 10, the crank arm 277 rotates counterclockwise also, and through the medium of the stud and slot connection causes the cam plate 281, the shaft 283, the cam 285 and the sector gear 287 all to rotate in a clockwise direction under the control of the handle 39.

A pinion 291 is in mesh with the sector gear 287 and is firmly affixed to a shaft 293 which also has two additional pinions 295 rigidly affixed thereon. The pinions 295 engage two racks 297 which have a toothed surface along their upper side and which are rigidly joined together by a bar 299 at their farthest left-hand end as seen in FIG. 10. When the sector gear 287 rotates clockwise, the pinion 291, the shaft 293, and each of the pinions 295 rotate in a counterclockwise direction, driving the two racks 297 to the right as seen in FIG. 10.

Referring now also to FIG. 2, it will be seen that the bar 299 engages the leftmost portion of each of the actuator racks 63, and urges them from the number positions, to which they have been previously set, back toward the right to the blank position. Each of the racks 297 which forms the sides of the restoring frame together with the bar 299 has a slot 301 which is adapted to be engaged by a spring urged stop bar 303 when the restoring frame 297, 299 has brought the actuator racks 63 back to the blank position (29 in FIG. 1). This stop arrangement 301, 303 prevents the actuator racks 63, the intermediate pinions 71, and the character bearing print wheels 75 from being reset past the blank position. The numeral restoring mechanism is reset to its normal position by spring means, which may conveniently be applied to the crank arm 277, for example by means of a torsion spring 305.

The clockwise rotation of the cam 285 causes the upward movement of the cam follower 307 and the consequent counterclockwise rotation of the arm 309. The arm 309 is rigidly affixed to a shaft 311 (this shaft 311 is also shown in FIG. 2). Carried by the shaft are a number of spring fingers 313. These spring fingers ride in the spaces between the gear teeth in the intermediate pinions 71. There is one spring finger 313 for each intermediate pinion 71 which acts to detent resiliently the intermediate pinion into alignment when the handle 39 is in its normal position.

The shape of the cam 285 is such that when it starts to rotate under the control of the handle 39, the shaft 311 is rotated counterclockwise to release the tension on the spring fingers 313. This action enables the pinions 71 to rotate freely during the time that they are being reset along with the associated actuator racks 63 back to the blank position. Just prior to the time when the racks 63, the pinions 71, and the character wheels 75 reach the blank position, that is as they are going from the one to the zero position, the cam follower 307 is forced into clockwise rotation by the surface of the cam 285 to again place tension on the spring fingers 313. When the racks 63, pinions 71, and character wheels 75 move from the zero position to the blank position, the spring fingers 313 are under full tension to detent the intermediate pinions 71 and thereby provide an additional safeguard against the mechanism being overthrown.

*Document gauge*

Figure 12:
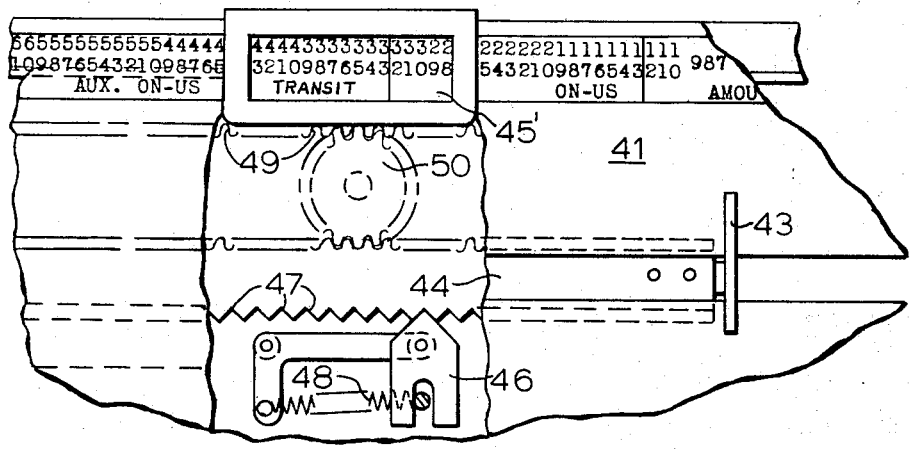
FIG. 12 is a front view, partly in section, illustrating a document gauge for use with the machine.

Referring now to FIG. 12, one form of document gauge which may be utilized to position the document being imprinted is shown. The gauge generally is in the form of a channel and the document is inserted by the operator fully against the bottom of the channel to properly position the interlocks as explained above in conjunction with FIGS. 6 and 6A. The right-hand side stop 43 (shown in FIG. 1) is conveniently carried by a longitudinally slidable rack 44. The rack 44 is selectively movable to a plurality of different positions in which it will be detented by a resilient pawl 46 acting in the teeth 47 under urging of a spring 48. In the version of the gauge shown in FIG. 12, an indicating window 45' is carried by another rack 49 which moves in a complementary fashion to rack 44 through the agency of a gear 50 secured to the document gauge 41. The window 45' has a width equal to the number of spaces in which the machine can print on the document, in this case sixteen character spaces. The character spaces in the gauge shown at the top of FIG. 12 correspond to the numbers of the character spaces in the specifications for machine language of mechanized check handling of the American Bankers Association. The right-hand tab 43 positions the right-hand edge of the document so that spaces 1 through 16 are in front of the sixteen print wheels 75. If the tab 43 is to its farthest right-hand position, the document placed against this tab stop will have its printing position opposite spaces 50 through 65 of such character spaces.

Figure 13:
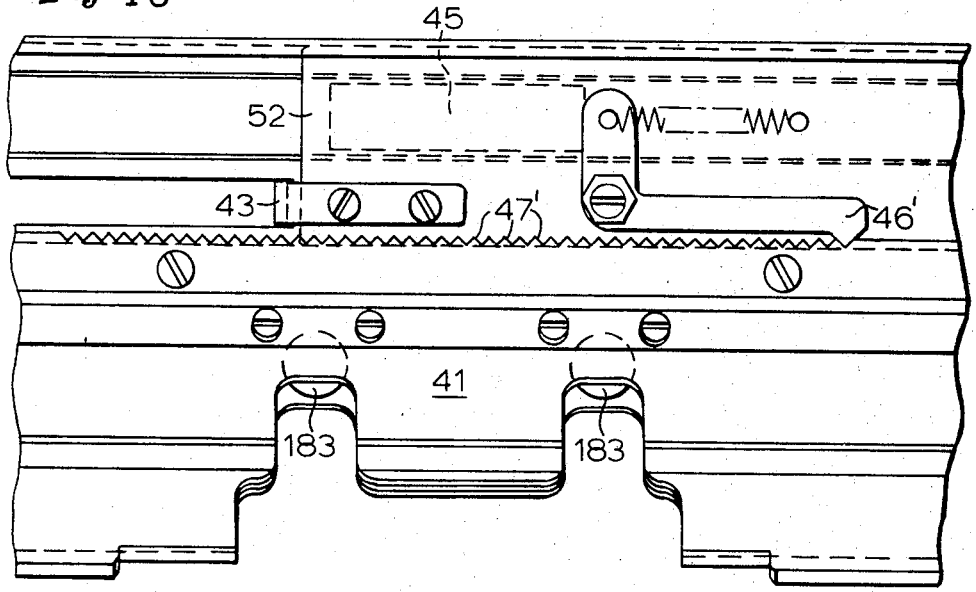
FIG. 13 is a rear view illustrating an alternative document gauge.

FIG. 13 illustrates a slightly different form of document gauge, and this gauge is the one shown in FIGS. 1, 5 and 6. The view of FIG. 13 is from the back to illustrate the single slide 52 which is employed in this construction. The indicating window 45 (shown dotted in FIG. 13) is cut into the document gauge 41 rather than being carried by the longitudinally slidable rack 49 in the previous figure. A slightly different arrangement of saw teeth 47' to provide the detenting for each space to which the slide 52 is adjustable is found in the arrangement of FIG. 13. A pawl 46' is carried by the slide 52 to position the slide with respect to the individual character spaces. The right-hand tab stop 43 is affixed to the slide. As will be understood from an inspection of this FIG. 13 and FIG. 1, the scale showing the numbered character spaces in which spaces the machine is capable of printing is carried on the slide 52.

The remainder of the channel, showing for example the positioning of the hold-down balls 184 mentioned in the description of FIG. 9 is also shown in FIG. 13.

*Operation timing*

Referring now to FIG. 11, the timing and displacement of certain mechanisms is shown in terms of the rotation of the main driveshaft 123. Several of these curves of displacement versus rotation of the main camshaft have been referred to in the detailed description of various parts.

Main drive sector 227 is indicated in FIG. 11 as having its counterclockwise rotation (counterclockwise as seen in FIG. 9) shown in an upward direction of the graph in FIG. 11.

The yoke 211 has its rightward movement (as seen in FIG. 9) shown in an upward direction in FIG. 11.

The platen 207 has its right or document engaging movement shown (as shown in FIG. 8) indicated in the upward direction in the graphical representation in FIG. 11.

The rolling contact of the platen 207 with the character wheels 75 as the platen moves across those wheels is indicated by upwardly extending lines in FIG. 11 which indicate the center of character engagement of each of the sixteen character positions.

The engagement of the alignment bail 171 in the upward direction as shown in FIGS. 6 and 6A is indicated graphically in the upward direction of FIG. 11.

Movement of the pawl of the ribbon advance lever 263 occurs near the end of the machine cycle, from 280° to 360° of main shaft rotation to rotate the take-up spool 255 counterclockwise. The downward movement indicated by the graph of 263 on FIG. 11 is an idle movement with the pawl 257 resiliently slipping in the clockwise direction along the toothed surface of the wheel 255.

The trip and reset action of the cycle trip slide 101 and link 103 is shown by the rightward movement of the slide and link being indicated by a downward direction in the showing of FIG. 11. The reset movement, to the left in FIG. 5, takes place from about 300° to about 330° of main driveshaft rotation.

*Summary*

In accordance with the above detailed description, a portable machine for encoding number and symbol information on documents for automated information handling systems has been provided. A printing couple which calipers the pressure and separation of the printing members in accordance with the thickness of the document or assembly of documents being printed upon enables very high quality printing to be done in a simple operation. Interlocks which cause the machine to be released only when the document is properly inserted, and the print member and document are in the precise relation to each other, are provided.

While the machine of the present invention has been described as having its actuators and print members set by levers, it will be appreciated by those skilled in the art that a key set keyboard can be substituted for the lever set arrangement illustrated in this embodiment. Such mechanisms are well known, and their adaptability to apparatus of the type set forth in this application is clearly within the scope and spirit of the present invention.

The machine of this invention finds a special utility for encoding a document with any coding information which has not already been provided at the time the document enters an automatic information handling system. For example, a bank may utilize the present machine to supply amount, account number, or transit number information in a centralized encoding location, or the machine may be used at each teller's position to supply any missing encoding upon the very first presentation of the document.

While the invention has been described with respect to a preferred embodiment thereof, it will be understood that the invention and its various features are capable of changes and variations which are within the spirit and scope of the following claims.

We claim:

1. An encoder for printing on documents of different thicknesses having a printing couple including character types and a platen, a yoke carrying said platen and providing bodily lateral movement of the platen from one side to the other side of the yoke, means for moving said yoke together with the platen toward and away from said character types, two caliper members outside the printing area of said character types, one of said members carried by said yoke and the other having a fixed position with respect to said types, said caliper members acting to limit the travel of said yoke toward said types whereby a document inserted between said caliper members spaces said yoke an additional amount form said character types equivalent to the thickness of said inserted document.

2. An encoder for printing on documents of different thicknesses comprising a printing couple including a row of settable minting types and a rolling contact platen bodily laterally movable completely across the row of said printing types, a yoke carrying said platen and movable toward and away from said printing types, said platen being laterally movable in said yoke, two caliper members outside the printing area of said printing types, one of said caliper members carried by said yoke and the other having a fixed position with respect to said types, common driving means for said yoke and said platen acting to move said yoke toward said printing types and further acting to move said platen bodily laterally within said yoke, said caliper members meeting to limit the travel of said yoke toward said types whereby a document inserted between said caliper members spaces said yoke an additional amount from said printing types equivalent to the thickness of said inserted document.

3. An encoder having a printing couple including a row of individually rotatable character type wheels and an impression member movable toward and away from said row of type wheels, means forming a channel for receiving an inserted document between said row of type wheels and said impression member, said type wheels having grooves between adjacent printing types, an aligning bail pivotally mounted with respect to said type wheels and positioned to enter the grooves between adjacent characters when said wheels are aligned, means preventing entrance of the aligning bail into said grooves of the type wheels but responsive to the proper insertion of a document into said channel for permitting entry of the bail into the type wheel grooves, machine release means coupled to sense the penetration of said aligning bail into the space between adjacent character on said wheels to release the machine for operation only when the characters of said type wheels are aligned and a document is properly inserted in said channel receiving means.

4. An encoder having a printing couple including character type wheels and an impression member movable toward and away from said type wheels, a channel adapted to accept an inserted document between said type wheels and said impression member, said type wheels having grooves between adjacent printing types, an aligning bail pivotally mounted with respect to said type wheels and positioned to enter the grooves between adjacent characters when said wheels are aligned, machine release means coupled to sense the penetration of said aligning bail into the space between adjacent characters on said wheels to release the machine for operation only when said wheels are aligned, and a movable member having a portion extending into the channel and movable by a document properly inserted in said channel, a shoulder on said movable member extending into the path of movement of said aligning bail into said grooves but movable by the proper insertion of a document out of the path of said aligning bail to allow said types to be aligned and said machine to be released.

5. A document encoding device including in combination, a plurality of independently rotatable character type wheels assembled on a common axis, a platen adjacent to the type wheels and movable toward and away from the type wheels, means forming a channel for guiding an inserted document between said type wheels and said platen, document engaging means coupled to said platen for spacing said platen from said character type wheels by a distance equivalent to the thickness of the inserted document, grooves in said character type wheels between at least certain ones of the characters thereon and capable of being aligned with like grooves of the other type wheels of the assembly, an aligning bail constrained to move into a row of grooves in said type wheel assembly and operative to trip off said encoding device upon entry into said row of grooves, and further means in said channel normally blocking said aligning bail from entering said row of grooves but movable by a properly inserted document to permit said aligning bail to enter said grooves.

6. An encoder having a printing couple including character type wheels and a rolling contact platen adjacent to the type wheels and movable towards and away from the type wheels, means forming a channel for guiding an inserted document between said type wheels and said platen, document thickness sensing means forming a caliper composed of two opposing members wherein one of the members is fixed in relation to said character type wheels and the other is adjustable in relation to said platen for spacing the platen from the character type wheels by a distance equivalent to the thickness of the inserted document, a plurality of pinions, one for each character type wheel and in mesh with such character type wheel, a plurality of racks, one for each pinion and in mesh with said pinion, settable levers fastened to said racks and longitudinally movable to position said type wheels selectively, a keyboard having ordinal slots therein, each of said levers being longitudinally movable in a slot in the face of the keyboard, locking means cooperating with said levers and said slot acting to secure said levers against movement in positions on one side of a predetermined position.

7. An encoder having a printing couple including character type wheels and a rolling contact platen adjacent to the type wheels and movable towards and away from the type wheels, means forming a channel for guiding an inserted document between said type wheels and said platen, document thickness sensing means for spacing said platen from said character type wheels by a distance equivalent to the thickness of the inserted document, a plurality of pinions, one for each character type wheel and in mesh with such character type wheel, a plurality of racks, one for each pinion and in mesh with said pinion, settable levers fastened to said racks and longitudinally movable to position said type wheels selectively, a keyboard having ordinal slots therein, each of said levers being longitudinally movable in a slot in the face of the keyboard, resilient locking means for holding the character type wheels in place for printing, locking means cooperating with said levers and said slots effective to release the resilient means holding the character type wheels and to secure said levers against movement in positions on one side of a predetermined position, and resetting means for said type wheels acting to return said levers to said predetermined position when said levers have been moved to the other side of said predetermined position.

8. An encoder for printing on documents of different thicknesses comprising a printing couple including settable character types and a rolling contact platen movable across said types, a yoke carrying said platen driving means to move said yoke and platen toward and away from said character types, said platen being laterally movable in said yoke, two sets of caliper members outside the printing area of said character types, one of said caliper members of each set being carried by said yoke and the other caliper member of each set having a fixed position with respect to said types, said caliper members of each set meeting to limit the travel of said yoke toward said types whereby a document inserted between said caliper members spaces said yoke an additional amount from said character types equivalent to the thickness of said inserted document, and a helical driving gear journaled for rotation in said yoke and having an operative connection with said platen for moving the platen laterally when the gear is rotated said driving means also acting to rotate said helical gear and thus impart lateral movement to the platen when said yoke has been moved toward said types to effect rolling contact printing between the couple.

9. An encoder having a printing couple including character type wheels and a rolling contact platen movable across said character type wheels, a yoke carrying said platen, driving means to move said yoke and platen toward and away from said character type wheels, said platen being laterally bodily movable in said yoke from one side to the other side thereof, two sets of caliper members outside the printing area of said character wheels for gauging the thickness of an inserted document, one of said caliper members of each set being secured to said yoke adjacent each end of the path of travel of the platen and the other having a fixed position with respect to said character wheels, a plurality of pinions, one for each character type wheel and in mesh with such character type wheel, a plurality of racks, one for each pinion and meshed with said pinion, settable levers fastened to each of said racks and longitudinally movable to position said type wheels selectively, a keyboard, each of said settable levers being longitudinally movable in a slot in the face of the keyboard, a roller at the ends of each slot, an endless belt passing around each of said rollers and being secured to the lever movable in the slot with which its rollers are associated, so that the position of said belt is directly proportional to the position of said settable lever.

10. An apparatus for close tolerance single impression printing comprising:
a set of individually settable, coaxial, equal diameter, print wheels,
means for angularly setting said print wheels,
an impression member cooperating with said print wheels including a yoke, a rolling platen reciprocable within said yoke in a line parallel to the axis of said print wheels, and resilient means urging said yoke toward said set of print wheels,
a throat member for precisely aligning a document to be printed with respect to said set of print wheels, and for maintaining said alignment during printing,
caliper means for precisely spacing said impression member with respect to a document aligned in said throat including gauge means threaded into said yoke and anvil means on said throat member, said gauge means and said anvil means being positioned on opposite sides of a document aligned in said throat means,
single cycle driving means for moving said impression member toward said set of print wheels until stopped by the interaction of said caliper means through a document in said throat member, for rolling said platen across a document in said throat member after engagement of said caliper means, and for returning said impression member, including said platen, to original position,
first interlock means for preventing the cycling of said driving means when said print wheels are not properly set, and
second interlock means for preventing release of said first interlock means until a document is properly aligned in said throat means for printing.

11. The apparatus of claim 10 wherein said means for setting said print wheels comprises first and second groups of key means, each key means including a manually operable key selectably movable from a nonprint to one of a plurality of print positions for setting said print wheels, said first group of key means having detent means for maintaining the keys of such key means in print position during a series of printing operations.

12. The apparatus of claim 10 wherein the throat member comprises:
a channel shaped to receive a document to be encoded and having a limited thickness space to guide said document between said print wheels and said impression member; and
spherical weight means in said channel cooperating with a wall portion thereof to hold said document.

13. An encoder for printing on documents of different thicknesses with uniform pressure comprising, in combination, a printing couple including a row of settable character types and a circular roller platen for engaging a document inserted therebetween, a yoke carrying said platen and movable toward and away from the row of character types, said yoke providing lateral bodily movement of the platen along a path of travel opposed to the row of character types and for the full extent thereof and further providing rotation of the platen about its axis while in engagement with an inserted document, means for gauging the thickness of an inserted document including a pair of caliper members disposed outside of the printing area of the character types, one of which is carried by the yoke and the other of which has a fixed position with respect to the character types, said caliper members engaging opposite sides of an inserted document thereby limiting the travel of the yoke toward the row of character types, a source of motive power including a rotatable driving member, means coupling the yoke to the driving member and operable upon rotation thereof first to move the yoke toward the character types until stopped by the engagement of the caliper members with an inserted document therebetween and then to move the yoke back to a retracted position, and means coupling the platen to the driving member and operable to roll the platen along an inserted document from one to the other end of the row of character types when the yoke has been brought to a stop by the caliper members and then to return the platen to the first end of the row of character types after the yoke is retracted therefrom.

14. An encoder for printing on documents of different thicknesses with uniform pressure comprising, in combination, a printing couple including a row of settable character types and a circular roller platen for engaging a document inserted therebetween, a yoke carrying said platen and mounted for movement toward and away from the row of character types, said yoke providing lateral bodily movement of the platen along a path of travel opposed to the row of character types and for the full extent thereof and further providing rotation of the platen about its axis while in engagement with an inserted document, a source of motive power including a single cycle rotatable driving member, means coupling the yoke to the driving member and operable in the early part of the cycle of the driving member to move the yoke toward the character types until the platen is in rolling engagement with an inserted document and in the later part of the cycle of the driving member to move the yoke back to a retracted position, and means coupling the platen to the driving member and operable in the early part of the cycle of the driving member to roll the platen along an inserted document from one to the other end of the row of character types and in the later part of the cycle of the driving member to return the platen to the first end of the row of character types after the yoke is retracted therefrom.

15. An encoder for printing on documents of different thicknesses comprising, in combination:
   a row of character type wheels of like diameter and individually rotatable about a common axis,
   means for angularly setting said type wheels about said common axis,
   a carriage mounted for movement toward and away from the row of type wheels,
   a circular platen journaled in said carriage for rotation about an axis extending perpendicular to the path of movement thereof and mounted in the carriage for bodily movement along a path of travel in opposed parallel relation to the row of type wheels and for the full extent thereof,
   a helical gear journaled in said carriage for rotation about an axis parallel to the common axis of said type wheels and having an operative connection with the platen for bodily moving the same in one or the other direction along the row of type wheels depending upon the direction of rotation of the gear,
   a drive member rotatable about an axis in one direction,
   means coupled to said drive member for moving said carriage together with the platen and helical gear toward and away from the row of type wheels,
   a caliper device for measuring the thickness of a document inserted between the row of type wheels and the platen including a pair of opposing members located outside of the printing area of the type wheels, one member of said caliper being movable with the carriage and the other member of the caliper having a fixed position with respect to the type wheels, said caliper members adapted to be brought up into abutment with opposite sides of an inserted document when the carriage is moved toward the type wheels thereby to space the platen wheel from the type wheels by an amount substantially equivalent to the thickness of the document, and
   means coupled to said drive member for reversely rotating the helical gear first in one direction when the platen is in engagement with an inserted document in order to cause rolling line contact of the platen with the document from one end to the other end of the row of type wheels and then in the opposite direction when the carriage is away from the type wheels to cause the return of the platen to the initial end of the row of type wheels.

16. An encoder for printing on documents of different thicknesses comprising, in combination:
   a row of character type wheels of like diameter and individually rotatable about a common axis,
   means for angularly setting said type wheels about said common axis,
   a carriage mounted for movement toward and away from the row of type wheels,
   a circular platen journaled in said carriage about an axis extending perpendicular to the path of movement thereof and mounted in the carriage for lateral bodily movement in a direction parallel to the row of type wheels and for the full extent thereof,
   a helical gear journaled in said carriage for rotation about an axis extending parallel to the common axis of said type wheels and having an operative connection with the platen for bodily moving the same in one or the other direction along the row of type wheels depending upon the direction of rotation of the gear,
   means for moving said carriage assembly together with the platen and helical gear toward and away from the row of type wheels,
   a caliper device for measuring the thickness of a document inserted between the row of type wheels and the platen including a pair of opposing members located outside of the printing area of the type wheels, one member of the pair being carried by the carriage and the other member having a fixed position with respect to the type wheels, said caliper members adapted to engage opposite sides of an inserted document when the carriage approaches the type wheels in its movement theretoward thereby to space the platen wheel from the type wheels an amount substantially equivalent to the thickness of the document, and
   means for rotating the helical gear first in one direction when the platen is in engagement with an inserted document in order to cause rolling line contact of the platen with the document from one end to the other end of the row of type wheels and then in the reverse direction when the carriage is away from the type wheels in order to return the platen to the first said end of the row of type wheels.

17. Apparatus for printing on documents comprising, in combination:
   a row of individually settable printing elements,
   means for setting said printing elements,
   a carriage mounted for movement toward and away from the row of printing elements,
   a circular platen journaled in said carriage about an axis extending perpendicular to the path of movement thereof and mounted in the carriage for lateral bodily movement in a direction parallel to the row of printing elements and for the full extent thereof,
   a helical gear journaled in said carriage for rotation about an axis parallel to the row of printing elements and having an operative connection with the platen wheel for bodily moving the same in one or the other direction along the row of printing elements depending upon the direction of rotation of the gear,
   means for moving said carriage assembly together with the platen and helical gear toward and away from the row of printing elements, and
   means for rotating the helical gear first in one direction when the platen is in engagement with an inserted document in order to cause rolling line contact of the platen with the document from one end to the other end of the row of printing elements and then in the reverse direction when the carriage is away from the printing elements in order to return the platen to the first said end of the row of type wheels.

References Cited
UNITED STATES PATENTS

| | | | |
|---|---|---|---|
| 1,373,245 | 3/1921 | Hughes | 101—68 |
| 1,389,215 | 8/1921 | Payne | 101—97 |
| 1,654,796 | 1/1928 | Duff et al. | 101—94 |
| 1,787,234 | 12/1930 | Bohrer et al. | 101—95 X |
| 2,043,600 | 6/1936 | Ward | 101—95 |
| 2,070,763 | 2/1937 | Ward | 101—96 |
| 2,260,970 | 10/1941 | Elder | 101—274 X |
| 2,272,371 | 2/1942 | Hart et al. | 101—94 |
| 2,573,756 | 11/1951 | Anderson | 101—95 |

(Other references on following page)

UNITED STATES PATENTS

| | | | |
|---|---|---|---|
| 2,583,486 | 1/1952 | Keuper | 101—95 |
| 2,916,129 | 12/1959 | Parker | 197—128 |
| 3,025,787 | 3/1962 | Ferguson et al. | 101—95 |
| 3,095,079 | 6/1963 | Morelli et al. | 197—183 |
| 3,137,379 | 6/1964 | Oberholzer | 197—128 |
| 3,138,091 | 6/1964 | Maul | 101—56 X |
| 3,204,555 | 9/1965 | Inove | 101—95 |
| 3,232,230 | 2/1966 | Sheldon | 101—56 X |
| 3,245,595 | 6/1966 | Sparrow et al. | 101—93 |

WILLIAM B. PENN, *Primary Examiner.*

ROBERT E. PULFREY, *Examiner.*

P. R. WOODS, *Assistant Examiner.*